Jan. 29, 1929.

W. C. ANTHONY 1,700,426

WINCH MECHANISM

Filed Jan. 5, 1925  2 Sheets-Sheet 1

Inventor
William C. Anthony
by Parker & Carter
Attorneys.

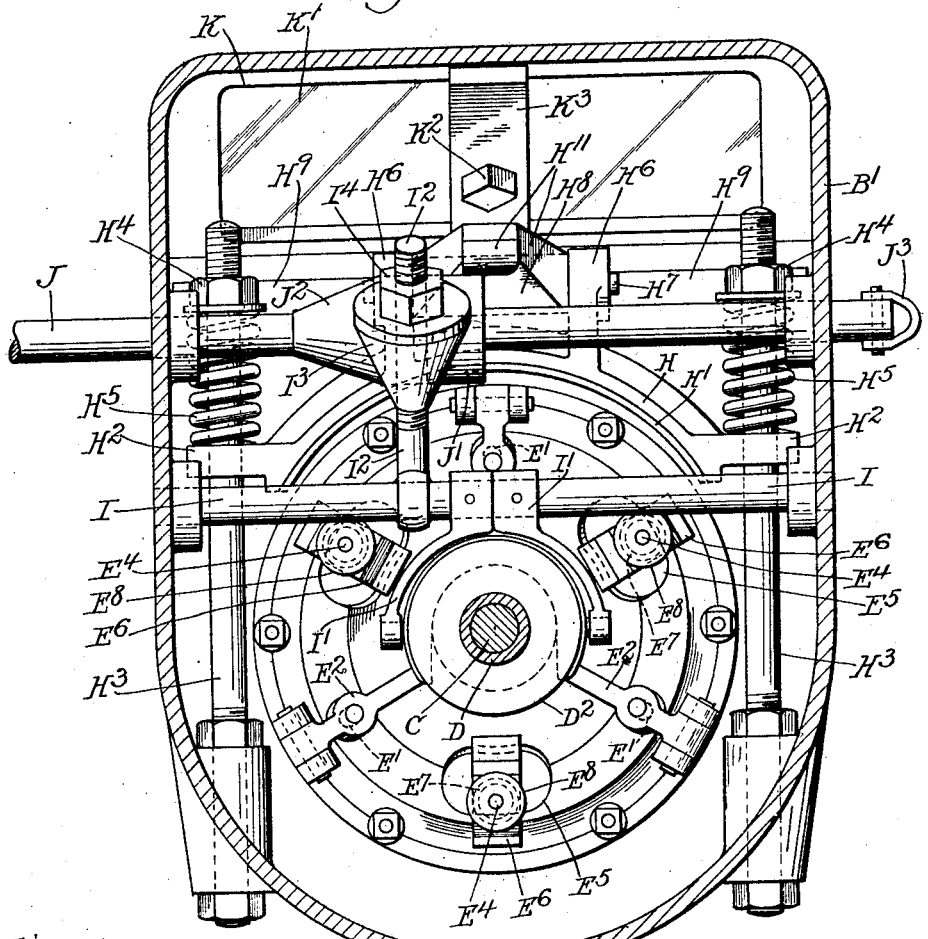
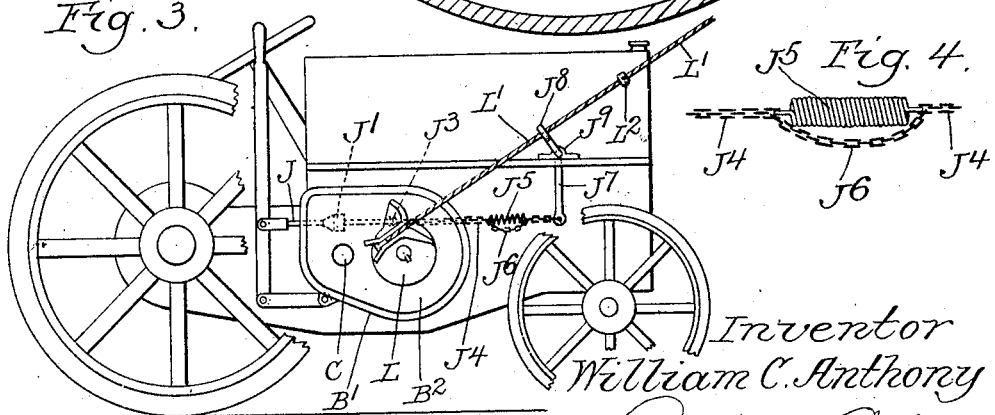

Patented Jan. 29, 1929.

1,700,426

UNITED STATES PATENT OFFICE.

WILLIAM C. ANTHONY, OF STREATOR, ILLINOIS, ASSIGNOR TO ANTHONY COMPANY, OF STREATOR, ILLINOIS, A CORPORATION OF ILLINOIS.

WINCH MECHANISM.

Application filed January 5, 1925. Serial No. 555.

This invention relates to a hoisting mechanism which includes a clutch and a brake and means for selectively operating them. In the form illustrated herewith the hoisting mechanism is applied to an automotive vehicle, and it is designed to be operated by it, taking power preferably from the driving shaft of the vehicle. One object of my invention is to provide an operating mechanism which is proof against sticking and jamming and which will permit the clutch to be released suddenly so as to prevent dragging. Other objects will appear from time to time throughout the specification and claims.

My invention is illustrated more or less diagrammatically in the accompanying drawings, wherein:

Figure 2 is a transverse vertical cross section taken on line 2—2 of Figure 1;

Figure 3 is a side elevation with parts broken away showing the hoisting mechanism applied to a tractor;

Figure 4 is a detailed view on an enlarged scale showing a flexible link in the operating mechanism.

Like parts are indicated by like characters throughout.

Figure 1:
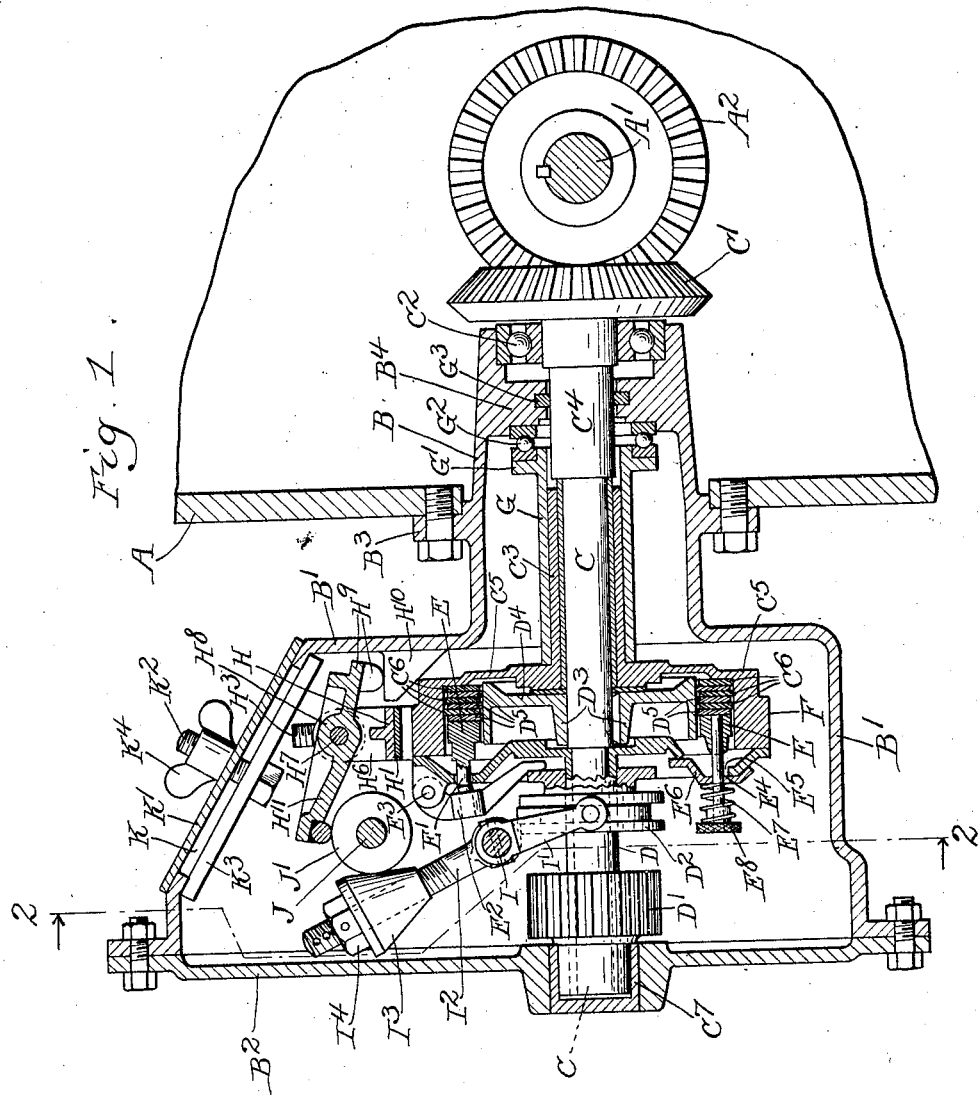
Figure 1 is a vertical cross section showing a portion of the vehicle and the hoisting mechanism.

A is a portion of the framework or casing of a vehicle. $A^1$ is the drive shaft of the vehicle. Upon it is mounted a bevelled gear $A^2$.

Extending outward from the side of the tractor is a housing formed of a generally tubular portion B and an enlarged box-like portion $B^1$ which encloses the major part of the winch mechanism. The portion $B^1$ is provided with an open side having a removable closure $B^2$ therefor. The portion B is provided with an outwardly extending flange $B^3$ by means of which the casing is fastened to the frame A of the vehicle. Within the tubular portion B is an inwardly extending flange $B^4$ which supports bearings and other parts later to be described.

C is a shaft within the housing B and carrying at its inner end a bevelled gear $C^1$ which meshes with a gear $A^2$ on the shaft $A^1$. The shaft is carried at its inner end in a bearing $C^2$ located within and adjacent the inner end of the tubular housing portion B. Mounted upon the shaft C is a sleeve $C^3$ which stops short of the enlarged portion $C^4$ of the shaft C. The sleeve $C^3$ carries at its outer end a clutch housing $C^5$. Fixed within the clutch housing $C^5$ are a plurality of clutch discs or plates $C^6$. At its outer end the shaft C is journaled in a bearing $C'$ in the outer cover plate $B^2$.

Mounted upon the shaft C adjacent its outer end is a sleeve D, which carries a driving pinion $D^1$. Mounted also on the sleeve D is a clutch collar $D^2$ which is moved in a manner described below to operate the clutch ring E. $D^3$ is a hub keyed to the shaft C and provided with an outwardly extending portion $D^4$ which has fixed to it a number of discs $D^5$. Thus by movement of the collar $D^2$ the clutch is operated so that the sleeve D carrying the pinion $D^1$ is caused to rotate with the shaft C.

The outer surface F of the housing $C^5$ serves as a braking surface. Mounted outside of the sleeve $C^3$ is a second sleeve G, which has a laterally extending flange $G^1$ at its inner end which is adapted to carry a portion of the thrust bearing $G^2$ which is seated in the inner end of the portion $B^4$ of the tubular housing B. $G^3$ is a packing within the housing, fixed in the portion $B^4$ and engaging the shaft C at the enlargement $C^4$.

The clutch ring E is made thick as shown and is provided with a plurality of outwardly extending push rods $E^1$. These rods are engaged by levers $E^2$ pivoted on the clutch housing at $E^3$ and having their ends engaged by the collar $D^2$. Fixed to the clutch ring E is a plurality of withdrawal rods $E^4$. Extending across openings $E^5$ in the clutch housing are spring supporting plates $E^6$. About the rods $E^4$ are helical springs $E^7$. On the outer end of the rods and holding the spring in place are adjusting nuts $E^8$. Compression is placed upon the springs by adjustment of the nuts $E^8$ and the springs tend to withdraw the clutch ring and release the clutch. When the collar $D^2$ is moved inward the levers E are depressed, and pressing upon the pins $E^1$, force the clutch ring into position and the clutch into engagement.

The brake mechanism will now be described: H is a brake shoe, provided preferably with a friction lining $H^1$. The shoe is formed concentric with the clutch housing and is adapted to engage the braking surface on the outside of the housing. It is provided with two laterally extending ears $H^2$ $H^2$ through each of which passes a rod $H^3$. Fixed in the housing $B^1$ and threaded adjacent its upper end to receive a nut $H^4$. Between each of the nuts $H^4$ and the ears $H^2$ is a helical spring $H^5$, upon the rod $H^3$. Extending upward from the brake shoe H is a second pair of ears $H^6$ $H^6$. Supported in said ears is a shaft $H^7$. Pivoted on said shaft is a brake operating lever arm $H^8$. It is provided at one end with an elongated contact arm $H^9$ which extends substantially across the housing $G^1$ and rests at either end upon a ledge $H^{10}$. Projecting forwardly from the center of the lever arm $H^8$ on the opposite side from the contact arm $H^9$ is a single arm $H^{11}$. It is provided, as is the lower arm $H^9$, with a curved under surface. When the arm $H^{11}$ is raised and lowered, the brake shoe moves with it. The springs $H^5$ tend normally to hold the brake located on the clutch housing.

I is a shaft supported within the housing $B^1$. Upon it is mounted a yoke $I^1$ which engages the clutch collar $D^2$ to move it. Fastened also on the shaft I is a lever arm $I^2$. This arm is moved backwards and forwards to rotate the shaft and move the clutch collar in and out and so to operate the clutch. Adjustably mounted on the lever $I^2$ is a generally conical contact member $I^3$. It is preferably interiorly threaded to engage the thread on the upper end of the lever $I^2$ and is further held in place by locking nuts $I^4$.

J is the control or operating shaft. It is slidably mounted within the housing $B^1$ and passes through it. It has on it a cam member $J^1$, provided with one generally cylindrical portion having sides parallel to the axis of the shaft J, and an inclined surface $J^2$. The adjustable contact member $I^3$ of the lever arm $I^2$ is at all times in engagement with the cam member $J^2$ either with the flat portion or the inclined portion. The curved contact point of the lever $H^{11}$ is also in contact with some part of the cam member $J^2$.

The shaft J may be connected at one end with a hand lever not here shown, and at its other end has a ring or loop $J^3$ to which a cable or other means for drawing it in and out may be attached.

The casing part $B^1$ has an open top K which is a hand hole and may be used for the purpose of lubrication, inspection and repair. It is covered by a removable plate $K^1$ which is held in place by means of a bolt $K^2$ and an engaging part $K^3$ and a thumb nut $K^4$.

$J^3$ is a connecting link fastened to the shaft J. $J^4$ is a chain attached to the connecting loop. Fastened to the chain intermediate its ends is a helical spring $J^5$. It is so fastened as to provide normally a slack portion $J^6$ between the ends of the chain. J' is a throw-out lever to which is attached one end of the chain $J^4$. The upper end of the lever $J^7$ is provided with a loop portion $J^8$ and the lever is pivotally mounted as at $J^9$.

L is a spool driven by a gear on the chain from the pinions $D^1$. $L^1$ is a hoisting cable fastened to the spool and adapted to be wound about it when the spool is rotated. $L^2$ is a stop fastened on the hoisting cable. The cable is passed through the loop portion $J^8$. When it is wound in to a sufficient degree the stop $L^2$ contacts the loop portion $J^8$ and through the lever $J^7$ and the chain $J^4$ pulls the operating shaft J to the right as shown in Figures 2 and 3 and so disengages the clutch and permits the brake to operate.

When it is desired to operate the driving mechanism shown in the drawings, the control or operating shaft is moved laterally. Normally it is held in position so that the brake band engages the clutch housing and the parts are stationary. When it is desired to operate, the operating shaft is moved laterally. This brings the inclined face of the cam $J^2$ first in contact with the upper lever arm of the brake operating lever. As the end of this lever rotates upward on the cam, the brake shoe is lifted from the clutch housing and the clutch is thus free to operate. As movement of the controlling shaft continues in the same direction, the conical contact member $I^3$ rides up on the cam face. The shaft I is thus rotated and the clutch operating yoke is operated to throw the clutch into engagement, and rotation is thus imparted to the sleeve D, carrying the pinion $D^1$, from the main shaft $A^1$. This movement will continue so long as the parts are held in the position described.

When it is desired to stop operation, the controlling shaft is moved in the reverse direction. The contact member $I^3$ first moves downward off of the cam $J^2$ and the clutch is thrown out of engagement by the springs $E^7$ which controls it and the rotation of the clutch stops so that the shaft is no longer driven. As the return movement of the controlling shaft is continued, the brake lever rides down off of the cam face $J^2$ and the brake is again brought into operation by the springs $H^5$ and the clutch is held against rotation.

The operation of the throw-out device is as follows: When the cable is drawn in about the spool to a sufficient degree, the stop contacts the lever of the loop arm $J^8$ and frequently the speed of the cable is great and the contact is violent. The first contact moves the lever J' violently to the right as shown in Figure 3 and expands the spring $J^5$. Subsequent movement of the parts is less violent and the spring is able to contract, and thus the spring jerks the operating shaft so as to disengage the clutch and operate the brake, and this is done almost instantaneously so that for an instant it is the spring which disengages the clutch and not the further downward movement of the stop on the hoisting cable. Thus provision is made for the inertia of the parts and means is provided for yielding of the cable, through the expansibility of the chain and the possibility of damage to the parts due to violent contact of the stop with the operating lever is avoided. Further than this when the parts have been brought to a stop even though the stop member L² is jammed positively against the portion J⁸, the flexibility remains in the spring so that the operator by using the hand control lever can free the parts and engage the clutch again. Thus the yielding link in the throw-out connection serves among other purposes to provide against breakage of the parts, to provide a means for compensating for the inertia of the parts, and to provide a degree of flexibility which permits the operator to disengage the brake and engage the clutch even when the throw out mechanism has been positively operated and held by the stop mechanism.

I claim:

1. In a clutch operating mechanism an operating lever carrying a conical contact member, in combination with an operating shaft mounted for axial movement and carrying a cam contact member adapted to contact said conical member and to move the lever.

2. In a clutch operating mechanism an operating lever carrying a conical contact member, in combination with an operating shaft mounted for axial movement and carrying a contact member adapted to contact said first conical member and to move the lever.

3. In combination with a clutch operating mechanism an operating lever carrying a conical contact member, in combination with an operating shaft mounted for sliding movement and carrying a cam contact member adapted to contact said conical member and to move the lever, said clutch provided with positive acting springs adapted at all times to tend to disengage the clutch.

4. In combination with a clutch operating mechanism an operating lever carrying a conical contact member, in combination with an operating shaft mounted for sliding movement and carrying a contact member adapted to contact said first conical member and to move the lever, said clutch provided with positive acting springs adapted at all times to tend to disengage the clutch.

5. In a clutch operating mechanism an operating lever carrying an adjustably mounted conical contact member in combination with an operating shaft mounted for sliding axial movement and carrying a conical contact member adapted to contact the first mentioned conical member to move the lever.

6. In combination in a driving mechanism, a driven shaft and a second shaft and means for driving the second from the first, said means including a clutch member adapted to rotate with each shaft and means for moving and holding them in operative engagement, said means including a lever active upon one of said clutch members and having a conical contact member upon it, in combination with an operating shaft having a conical contact portion upon it adapted to co-operate with said conical portion to move the clutch into operative position.

7. In combination in a driving mechanism, a driven shaft and a second shaft and means for driving the second from the first, said means including a clutch member adapted to rotate with each shaft and means for moving and holding them in operative engagement, said means including a lever active upon one of said clutch members and having a conical contact member upon it, in combination with an operating shaft having a conical contact portion upon it adapted to co-operate with said first mentioned conical portion to move the clutch into operative position.

8. In combination in a driving mechanism, a driven shaft and a second shaft and means for driving the second from the first, said means including a clutch member adapted to rotate with each shaft and means for moving and holding them in operative engagement, said means including a lever active upon one of said clutch members, and having an adjustably mounted conical contact member upon it, in combination with an operating shaft having a conical contact portion upon it adapted to co-operate with said conical portion to move the clutch into operative position.

9. In combination in a driving mechanism, a driven shaft and a second shaft, and means for driving the second from the first, said means including a clutch member adapted to rotate with each shaft and means for moving and holding them in operative engagement, said means including a lever active upon one of said clutch members and having a conical contact member upon it, in combination with an operating shaft having a conical contact portion upon it adapted to co-operate with said conical portion to move the clutch into operative position, said clutch provided with a thickened operating ring and spring means adapted automatically to release the clutch whenever it is free to do so.

10. In combination in a driving mechanism, a driven shaft and a second shaft and means for driving the second from the first, said means including a clutch member adapted to rotate with each shaft and means for moving and holding them in operative engagement, said means including a lever active upon one of said clutch members and having an adjustably mounted conical contact member upon it, in combination with an operating shaft having a conical contact portion upon it adapted to co-operate with said first mentioned conical portion to move the clutch into operative position, said clutch provided with a thickened operating ring and spring means adapted automatically to release the clutch whenever it is free to do so.

11. In combination in a driving mechanism a driven shaft, a clutch member mounted to rotate with it, a sleeve and means for driving the same from the driven shaft, said means including a clutch member adapted to cooperate with the first mentioned clutch member, a thickened clutch operating ring adapted to force and hold said clutch members in engagement, pins in said ring, springs adapted to act upon said pins and positively to withdraw them, and a clutch operating mechanism adapted to force the ring in in opposition to said springs, said operating mechanism including a yoke, a lever carrying an adjustably mounted conical contact member, and an operating shaft having a conical face adapted to contact and move said conical operating member.

12. In an operating mechanism a driven shaft and a rotary member adapted to be driven therefrom, a clutch controlling the operation of said rotary member and a brake for said member, such brake adapted to engage a portion of said clutch, and a unit control adapted to control both said clutch and said brake.

13. In a hoisting mechanism a driven shaft, and a rotary member adapted to be driven therefrom, a clutch controlling the operation of said rotary member and a brake mechanism therefor, such brake adapted to engage a portion of said clutch and a unit control adapted to control both said clutch and said brake.

14. In a hoisting mechanism a driven shaft, and a rotary member adapted to be driven therefrom, a clutch controlling the operation of said rotary member and a brake mechanism therefor, such brake adapted to engage a portion of said clutch and a unit control adapted to control both said clutch and said brake.

15. In an operating mechanism a power source and a rotary member adapted to be driven therefrom, a clutch controlling the operation of said rotary member and a brake for said member, and a unit control adapted to control both said clutch and said brake, and selective means for actuating said control.

16. In a hoisting mechanism a driven shaft and a shaft adapted to be driven therefrom, a clutch therebetween and a brake for the second shaft, and a unit control adapted when moved a predetermined distance to release said brake and when moved farther in the same direction to connect said clutch.

17. In a winch mechanism, a driven shaft, and a sleeve assembly adapted to be driven therefrom, a clutch adapted to connect said shaft and sleeve assembly to cause the sleeve to rotate with the shaft, in combination with a brake adapted to hold the same against movement, and a unit operating mechanism adapted to operate both said clutch and said brake, said mechanism including a shaft mounted for sliding movement and having a cam thereon, said cam adapted to engage an operating member for said brake and an operating member for said clutch.

Signed at Streator, county of La Salle and State of Illinois, this 26th day of December, 1924.

WILLIAM C. ANTHONY.